(No Model.)
C. A. JOHANSSON.
APPARATUS FOR EFFECTING EMULSIONS OF FATS WITH MILK, &c.
No. 336,324. Patented Feb. 16, 1886.
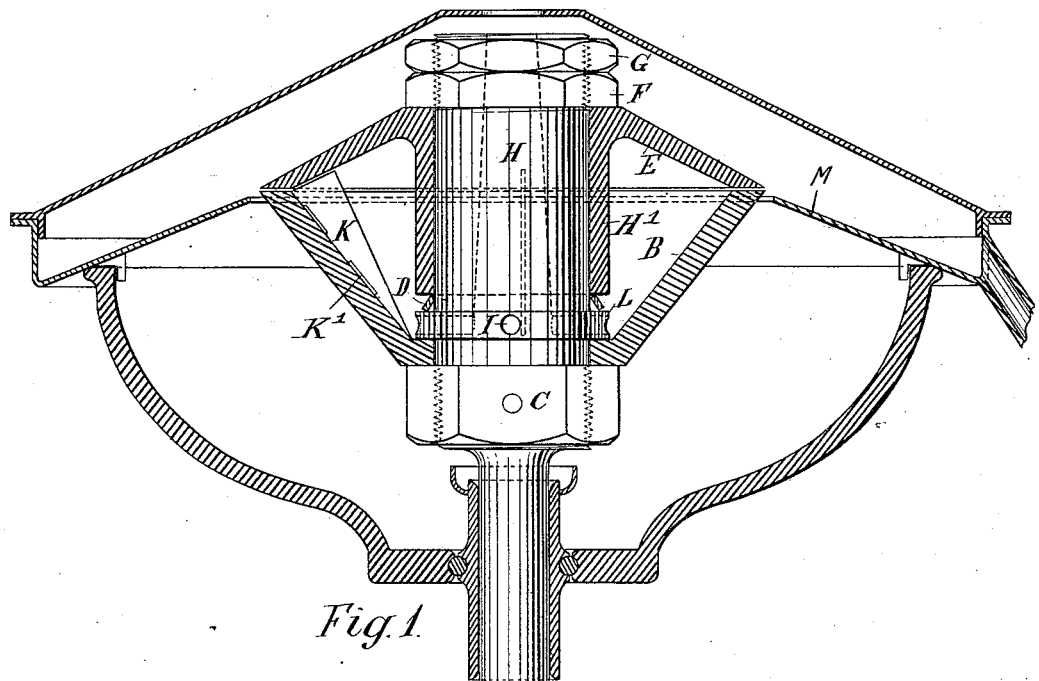
Fig. 1.
Fig. 2.
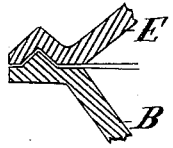
Fig. 3.
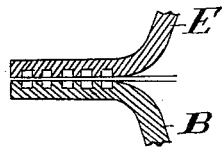
Witnesses:
C. Sedgwick
A. H. Davis
Inventor:
C. A. Johansson
By Munn & Co.
Attorneys.

UNITED STATES PATENT OFFICE.

CARL AUGUST JOHANSSON, OF STOCKHOLM, SWEDEN.

APPARATUS FOR EFFECTING EMULSIONS OF FATS WITH MILK, &c.

SPECIFICATION forming part of Letters Patent No. 336,324, dated February 16, 1886.

Application filed November 27, 1885. Serial No. 184,134. (No model.)

*To all whom it may concern:*

Be it known that I, CARL AUGUST JOHANSSON, of Stockholm, Sweden, have invented a new and Improved Apparatus for Effecting Emulsions of Fats with Milk, &c., of which the following is a full, clear, and exact description.

The object of my invention is to provide a new and improved apparatus for making emulsions.

Particularly this apparatus is intended to finely divide a liquid fat and intimately mix it with skimmed milk.

The invention consists in the construction and combination of parts and details, as will be fully described and set forth hereinafter, and then pointed out in the claims.

Reference is to be had to the accompanying drawings, forming a part of this specification, in which similar letters of reference indicate corresponding parts in all the figures.

Figure 1 is a cross-sectional view of my improved apparatus for making emulsions. Figs. 2 and 3 are enlarged detail sectional views of different constructions of the edges of the bowls.

The shaft A is mounted vertically to revolve, and has its upper end part made considerably thicker than the remaining parts, and near the lower end of said thicker part the annular flange or collar L is formed. The inverted conical cup or vessel B is provided at its lower and smaller end with an inwardly-projecting flange, which is placed against the bottom edge of the collar L, and is held firmly against the same by the nut C, which is screwed on the lower end of the thickened part of the shaft A and is drawn up tight. On the collar L the convex steel spring-ring D is placed, which ring may be replaced by any other suitable packing, and on said ring or packing the lower edge of the neck H' rests, which projects downward from the central opening of the conical cup E, the said neck fitting snugly on the thickened part of the shaft, and the bottom edges of the cup E resting on the edge of the cup B. The cup E and its neck H' are pressed down by the nut F, screwed on the upper end of the thickened part of the shaft A, and the nut F is locked in place by the lock-nut G. The adjacent edges of the two cups B and E are ground down and finished off very finely, so that they can fit very closely on each other and form a tight joint when desired. The two cups form an annular space or chamber around the neck H', which chamber has no other outlet but the annular opening between the edges of the two cups, which outlet can be increased or decreased, and is of uniform width throughout.

To cause a more thorough mixture and combination of the liquids in the cups while passing out through the above-mentioned vent, the said cups B and E may be provided with outwardly-projecting flanges, as shown in Figs. 2 and 3, and of said flanges one is provided with one or more annular ribs or projections, and the other with corresponding grooves, so that the liquids can pass through the vent only on a zigzag line, and thus are mixed more intimately; or annular grooves may be provided in the adjacent edges of both flanges, so that the liquids in leaving the cups are forced to pass through the narrow spaces between the grooves, and can then spread in the grooves alternately. The size of the vent or opening between the two cups can be regulated by forcing down the upper cup, by tightening the upper nut, or by raising the lower cup by means of its nut.

A channel or duct, H, extends downward from the top of the shaft A, and its lower end is connected with the channels I, extending to the outer surface of the collar L. Adjacent to each channel or duct I a wing, K, is formed and projects radially from the inner surface of the cup B, the widths of the wings increasing toward their upper ends. The said wings are provided with the slots or apertures K', close to the sides of the cup B, through which openings the liquids can pass. The object of the wings is to compel the liquids to participate in the revolution of the cups.

If desired, the two cups can be dispensed with, and a single vessel may be used which is provided with slots in planes perpendicular to the shaft A.

In operating the apparatus it is revolved with great rapidity, and the liquids to be united are conducted in given proportions into the cups through the channels H and I. The wings K' cause the liquids to revolve with the cups, and the centrifugal force causes a very rapid and thorough mixing of the liquids. The mixture of liquids gradually moves toward the vent and passes through the same, and in so doing the globules of fat are compressed and caused to mix thoroughly with the other liquid. The emulsion passing out through the vent flows upon the annular inclined apron M, or any other suitable vessel surrounding the cups, and said apron may be surmounted by a hood, if desired.

I have shown and described the shaft A as being mounted vertically; but, if desired, it may be mounted horizontally.

Having thus fully described my invention, I claim as new and desire to secure by Letters Patent—

1. An apparatus for making emulsions, consisting of a vessel mounted on a shaft and provided with a slot or narrow vent, substantially as herein shown and described.

2. An apparatus for making emulsions, consisting of two conical cups mounted on a shaft, so that the larger openings face each other and a narrow vent is formed between the edges of said cups, substantially as herein shown and described.

3. The combination, with the shaft A, of the two cups B and E, the former having the wings K, substantially as herein shown and described.

4. The combination, with the shaft A, provided with the collar L, of the cup B, the cup E, provided with the neck H', and of the packing L, between the edge of said neck and the collar L, substantially as herein shown and described.

5. The combination, with the shaft A, of the cups B and E, the collar L on the shaft, and the nuts C and F, substantially as herein shown and described.

6. The combination, with the shaft A, provided with the collar L, and the ducts or channels H and I, of the two cups B and E, substantially as herein shown and described.

7. The combination, with the shaft A, of the cup B, provided with the wings K, having the slots K', and of the cup E, substantially as herein shown and described.

8. The combination, with the shaft A, of the two cups B and E, between the edges of which a vent is formed, and of the apron M, surrounding the said cups, substantially as herein shown and described.

In witness whereof I have hereunto signed my name in the presence of two subscribing witnesses.

CARL AUGUST JOHANSSON.

Witnesses:
 NERE A. ELFWING,
 H. ANDERSSON.